United States Patent
Matsumoto et al.

[11] Patent Number: 5,825,724
[45] Date of Patent: Oct. 20, 1998

[54] MAGNETO-OPTICAL RECORDING METHOD USING LASER BEAM INTENSITY SETTING BASED ON PLAYBACK SIGNAL

[75] Inventors: Hiroyuki Matsumoto, Tokyo; Koichiro Ishii, Zushi, both of Japan

[73] Assignee: Nikon Corporation, Tokyo, Japan

[21] Appl. No.: 744,858

[22] Filed: Nov. 5, 1996

[30] Foreign Application Priority Data

Nov. 7, 1995 [JP] Japan ................................ 7-288308
Nov. 7, 1995 [JP] Japan ................................ 7-288309

[51] Int. Cl.$^6$ .................................................. G11B 11/00
[52] U.S. Cl. ............................. 369/13; 369/116; 369/54
[58] Field of Search .............................. 369/13, 14, 116, 369/54, 58; 360/59, 114; 365/122

[56] References Cited

U.S. PATENT DOCUMENTS

| | | | |
|---|---|---|---|
| 5,060,208 | 10/1991 | Nagai et al. | 369/13 |
| 5,185,733 | 2/1993 | Finkelstein et al. | 369/54 |
| 5,239,524 | 8/1993 | Sato et al. | 369/13 |
| 5,249,172 | 9/1993 | Hagihara et al. | 369/116 |
| 5,255,007 | 10/1993 | Bakx | 369/116 |
| 5,475,666 | 12/1995 | Ito et al. | 369/54 |
| 5,537,381 | 7/1996 | Fuji | 369/116 |
| 5,623,472 | 4/1997 | Bakx et al. | 369/116 |

FOREIGN PATENT DOCUMENTS 0 430 649 A2  6/1991  European Pat. Off. .
0 446 892 A2  9/1991  European Pat. Off. .

Primary Examiner—Tan Dinh

[57] ABSTRACT

A method of performing stabilized overwriteable optical recording, wherein overwriting is performed sufficiently even when erasure becomes poor when the low level laser beam intensity $P_L$ is set too low. The low level of recording laser beam intensity is set by playing back a test recording region by illuminating magnetization reversal areas after magnetization reversal areas have been formed in test regions of an overwriteable optical recording medium. Further, an erasure factor is found from the playback signal. In a second embodiment of a method of setting the recording laser beam intensity in order to perform recording on an overwriteable optical recording medium, before a test recording is performed, magnetization reversal areas are formed in a test recording region. These magnetization reversal areas are not erased, and a test recording is performed in this region by overwriting.

8 Claims, 2 Drawing Sheets

MAGNETO-OPTICAL RECORDING METHOD USING LASER BEAM INTENSITY SETTING BASED ON PLAYBACK SIGNAL

CROSS REFERENCE TO RELATED APPLICATIONS

This application is based upon and claims priority from Japanese Patent Applications Nos. 07-288308 and 07-288309, both filed on Nov. 7, 1995, the contents of each being incorporated herein by reference.

BACKGROUND OF THE INVENTION

1. Field of the Invention

The present invention relates to optical recording methods. More particularly, the present invention relates to optical recording methods where overwriting of data is possible using a laser beam.

2. Description of the Related Art

In recent years, there has been a proliferation of optical recording and replay methods, and of the optical recording devices, replay devices and recording media used therein. These devices satisfy the requirements for high density, large capacity, and high access speeds, together with high recording and replay speeds.

Many kinds of principles—opening holes by heat, phase change, magnetooptical and the like—have been used in optical recording and replay methods. Among these, the phase change or magnetooptical methods by which, after data has been recorded, it can be erased, thereby again allowing recording of new data, are being widely applied for external memories of computers and for consumer-use audio equipment.

Until lately, in methods of optical recording and playback, once data had been recorded, it was not possible to overwrite the data record with new data without performing an erasing process. However, just by modulating the intensity of an illuminating light beam in compliance with the digital data to be recorded, an optical recording method in which overwriting is possible, an overwriteable recording medium used therein, and a recording device which allows overwriting, have been proposed.

This is described as an example of magnetooptical recording. Moreover, patents have been applied for in several countries for this method, and among them, issued U.S. Pat. No. 5,239,524 and related Japanese Laid-Open Patent Publication 62-175948 and German Patent Application 3,619,618-A1. This invention is cited hereinbelow as the "basic invention".

The storage layer of the overwriteable magnetooptical recording medium of the basic invention which is used in the magnetooptical recording and playback method of the basic invention consists of multiple layers of magnetic layers having perpendicular magnetic anisotropy (perpendicular magnetic layer or layers). These magnetic layers include, for example, TbFe, TbFeCo, GdFe, GdFeCo, DyFe, DyFeCo and the like.

The medium used in the basic invention is "An overwriteable multi-layer magnetooptical recording medium, in which basically layers functioning as recording and playback layers (termed below "memory layers" or "M-layers"), consisting of perpendicularly magnetizable magnetic thin film(s), and recording auxiliary layer(s) (termed hereinbelow "recording layers" or "W-layers") consisting of the same perpendicularly magnetizable magnetic thin films, both layers being exchange-coupled, and also, at room temperature, only the magnetization of W-layers can be oriented in a predetermined direction without changing the direction of magnetization of the M layer." The W-layers, in comparison with the M-layers, have a low coercivity Hc at room temperature and a high Curie point Tc.

The data is then recorded in the M-layer (or as the case may be, also in the W-layer) as marks having a direction of magnetization perpendicular to the substrate ("A direction") and as marks having magnetization in a direction opposite to this ("anti-A direction").

In this medium, the W-layer can arrange its direction of magnetization in one direction by using a magnetic field (for example, an initial auxiliary magnetic field, $H_{ini}$) without changing the direction of the magnetization of the M layer. Furthermore, once the direction of magnetization of the W-layer has been arranged in one direction, it does not reverse even though it receives exchange coupling force from the M-layer. On the contrary, the direction of magnetization of the M-layer does not reverse even though it receives exchange coupling force from the W-layer, which was arranged in one direction.

In the recording method of the basic invention, only a direction of magnetization of the W-layer of the recording medium is arranged in one direction by a magnetic field just before recording. In addition to this, a laser beam, pulse modulated according to digitized data, illuminates the medium. The intensity of the laser beam is controlled to two values, a high level $P_H$ and a low level $P_L$, corresponding to a high level and a low level of the pulses. The low level is higher than the replay level $P_R$ which illuminates the medium during a replay process. Even when not recording, for example in order to access a predetermined recording place in the medium, the laser is generally controlled at a very low level. This very low level, also, is the same as, or close to, the replay level $P_R$.

In the case that a low level laser beam illuminates the medium, at the temperature which the medium reaches, the direction of magnetization of the W-layer does not change. The direction of magnetization of the M-layer becomes the direction of a state in which no magnetic walls exist between the M-layer and the W-layer. This is called a low temperature process. The temperature region according to this process is called the low temperature process temperature $T_L$.

On the other hand, in the case that a high level laser beam illuminates the medium, at the higher temperature which the medium reaches, the direction of magnetization of the W-layer follows the direction of the recording magnetic field. The direction of magnetization of the M-layer becomes the direction of a state in which no magnetic walls exist between the M-layer and the W-layer. This is called a high temperature process. The temperature region according to this process is called the high temperature process temperature $T_H$.

After illumination with the laser beam, by applying the magnetic field, the magnetization of the W-layer which followed the direction of the recording magnetic field due to the high level laser beam illumination, again follows the direction of the magnetic field. Accordingly, if the direction of magnetization of the magnetic field and the direction of the recording magnetic field are reversed, in the M-layer, already recorded, a recording reiterating a new recording (namely, overwriting) is possible. This is the principle of optically modulated overwrite magnetooptical recording.

The above described method forms a record mark by illumination with a high level laser beam, and erases the record mark by illumination with a low level laser beam, and can be said to overwrite a new record over an old record.

However, in the case of performing actual recording on an optical disk, in order to optimize the shape of the record marks, it is necessary to finely adjust the laser beam intensity in relation to the recording sensitivity of the disk to be recorded on, the optimum recording temperature, and the environmental temperature. At present, in magnetooptical disk recording devices presently marketed, a fine adjustment of the laser beam intensity is performed by performing a test recording before the actual recording of data.

Nevertheless, even when performing a fine adjustment of the laser beam intensity by performing a test recording, there were cases which were judged to be erroneous recording in overwrite optical recording. In such cases, the cause of this was generally that the recording marks from the previous time were not sufficiently erased by the low level $P_L$ laser beam intensity.

In optical intensity modulated overwrite recording, the failure to sufficiently erase is due to the low level laser beam intensity $P_L$. The low level laser beam intensity $P_L$ is an important parameter that effects not only recording, but also erasure. Even if the recording laser beam intensity was found by performing a test recording, overwriting was insufficiently performed, because erasure became poor when $P_L$ was set too low.

SUMMARY OF THE INVENTION

Accordingly, it is an object of the present invention to provide an optical recording method by which stabilized overwrite recording may be performed, solving the problems discussed above.

Other objects of the present invention are achieved by a method of optical recording that includes the steps of forming magnetization reversal areas in a test recording region of an overwriteable optical recording medium, illuminating the magnetization reversal areas with a laser beam, playing back the test recording region as a playback signal, and setting a low level recording laser beam intensity by finding an erasure factor from the playback signal.

Other objects of the present invention are achieved by a method of optical recording, comprising the step of forming magnetization reversal areas in a test recording region of an overwriteable optical recording medium, and setting a recording laser beam intensity by performing a test recording on the overwriteable optical recording medium, wherein the magnetization reversal areas are not erased, and the test recording is performed in this region by overwriting.

Additional objects and advantages of the invention will be set forth in part in the description which follows and, in part, will be obvious from the description, or may be learned by practice of the invention.

BRIEF DESCRIPTION OF THE DRAWING

These and other objects, features, and characteristics of the present invention may be better understood by studying the following detailed description and the appended claims and drawings, all of which form a part of this specification. In the drawings:

DETAILED DESCRIPTION OF THE PREFERRED EMBODIMENTS

Figure 1:
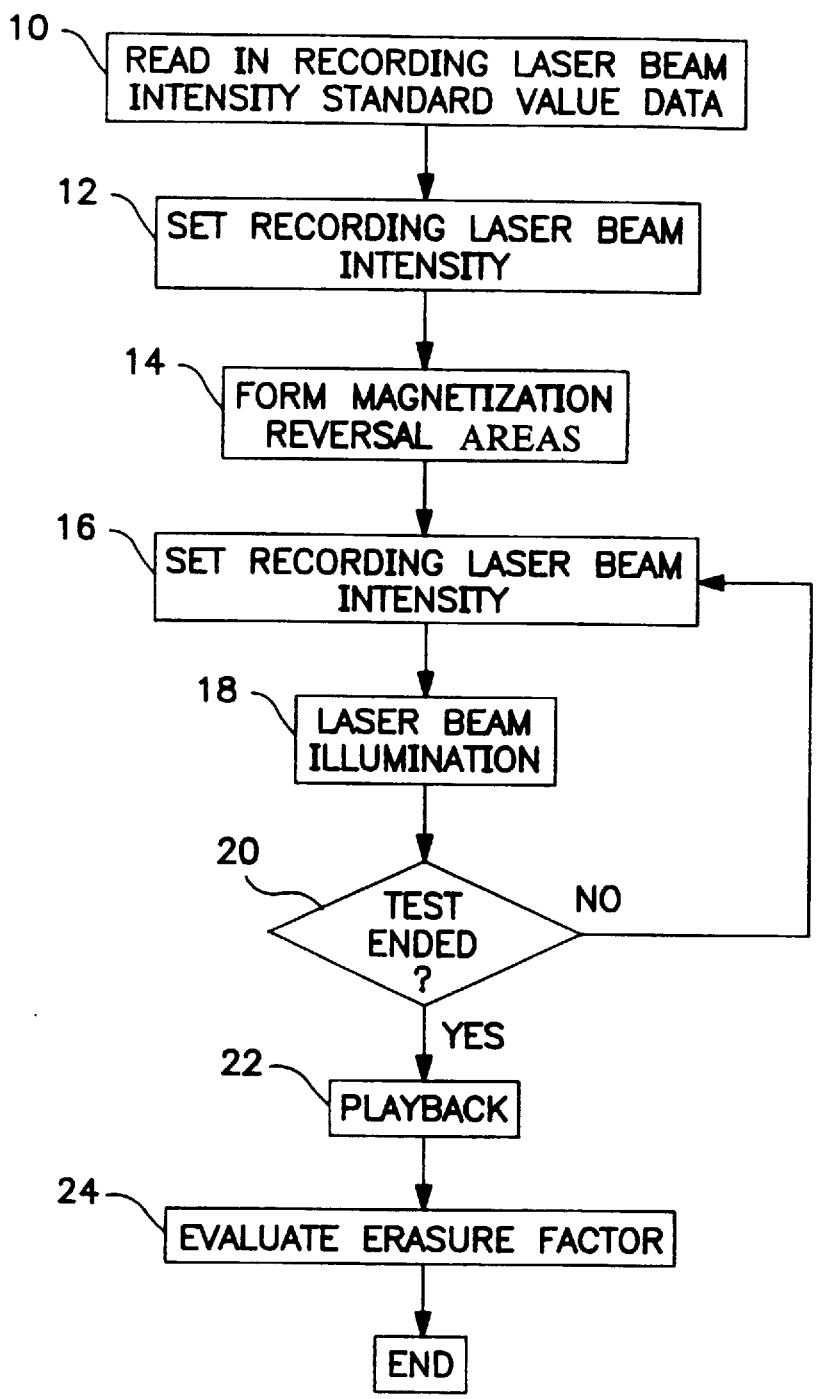
FIG. 1 is a flow chart which illustrates the optical recording method according to a first embodiment of the present invention.

Reference will now made in detail to the presently preferred embodiments of the present invention, examples of which are illustrated in the accompanying drawings. A description will next be given of the first embodiment of the present invention, with reference to FIG. 1.

A magnetooptical disk is provided which can be overwritten by optical modulation. This magnetooptical disk is divided into a plurality of zones whose recording frequencies differ. In a predetermined region, recording laser beam intensity standard value data for each recording zone is recorded.

Setting this magnetooptical disk in a record and replay device, data relating to recording laser beam intensity is read in from the predetermined region in step 10. From these values, a low level and a high level of laser beam intensity are set in step 12. These laser beam intensity values are for forming magnetization reversal areas in the test recording region in step 14. By setting the laser beam intensity in step 16 at this time to be larger than the standard value of recording laser beam intensity, magnetization reversal areas can be formed which are wider than the marks formed by the standard value. Moreover, when the setting value is much larger than a standard value, because there is a possibility that problems arise such that the data of adjacent track(s) is erased as a result, in practice, a setting of about 1% to 20% greater than the standard value is preferable.

Next, in a plurality of sectors of the test recording region, magnetization reversal areas are formed by a laser beam intensity which has been set in the above manner. After this, in the sectors in which magnetization reversal areas have been formed, illuminating the sectors in step 18 while causing the laser beam intensity to change in every sector or in every plurality of sectors, an erasure operation is performed.

Next, after the test has ended in step 20, when playing back the test recording regions in step 22, it is determined whether the magnetization reversal areas have been erased from the playback signal. There are a number of methods for such a determination. For example, there is the method in which, setting a standard erasure factor beforehand, the value which is taken as the low level of recording laser beam intensity is the intensity at which the erasure factor found from the playback signal is smaller than the standard erasure factor, as an intensity at which erasure is complete. Here, as the erasure factor, which is found in step 24, a ratio is made of the playback signal level before an erasure operation is performed, and the playback signal level after an erasure operation is performed. Moreover, when the value of the low level of recording laser beam intensity, once it has been found as abovementioned, is multiplied by a predetermined coefficient, and is taken as a new recording laser beam intensity, more reliable erasure becomes possible. The erasure factor is typically set between $\frac{1}{10}$ and $\frac{1}{2}$.

After the low level has been set, the high level is found by a test recording. There are a number of methods for doing this.

As a first method, playback is performed after a test pattern has been recorded, fixing the low level and causing the high level to change in every sector. Error detection is performed by a comparison of the signal pattern recovered from the playback signal with the test record pattern. The region in which no error is detected contains an appropriate value of the high level intensity. Namely, the region is one which shows that recording has been appropriately carried out, and the high level may be set close to the center of this region.

As a second method, playback is performed after a test pattern has been recorded by using repeated short marks and repeated long marks, fixing the low level and causing the high level to change in every sector. The offset amount of the center when repeating the short marks of the playback signal, and the offset amount of the center when repeating the long marks of the playback signal, are detected, and the high level at which their difference becomes zero is taken as the appropriate value for high level intensity.

The embodiment of the present invention as described hereinabove, in the case of recording on an overwriteable optical disk, because the recording laser beam intensity can be appropriately set, allows for the occurrence of stabilized overwriting, as insufficient overwriting is prevented as $P_L$ is not set too low.

Figure 2:
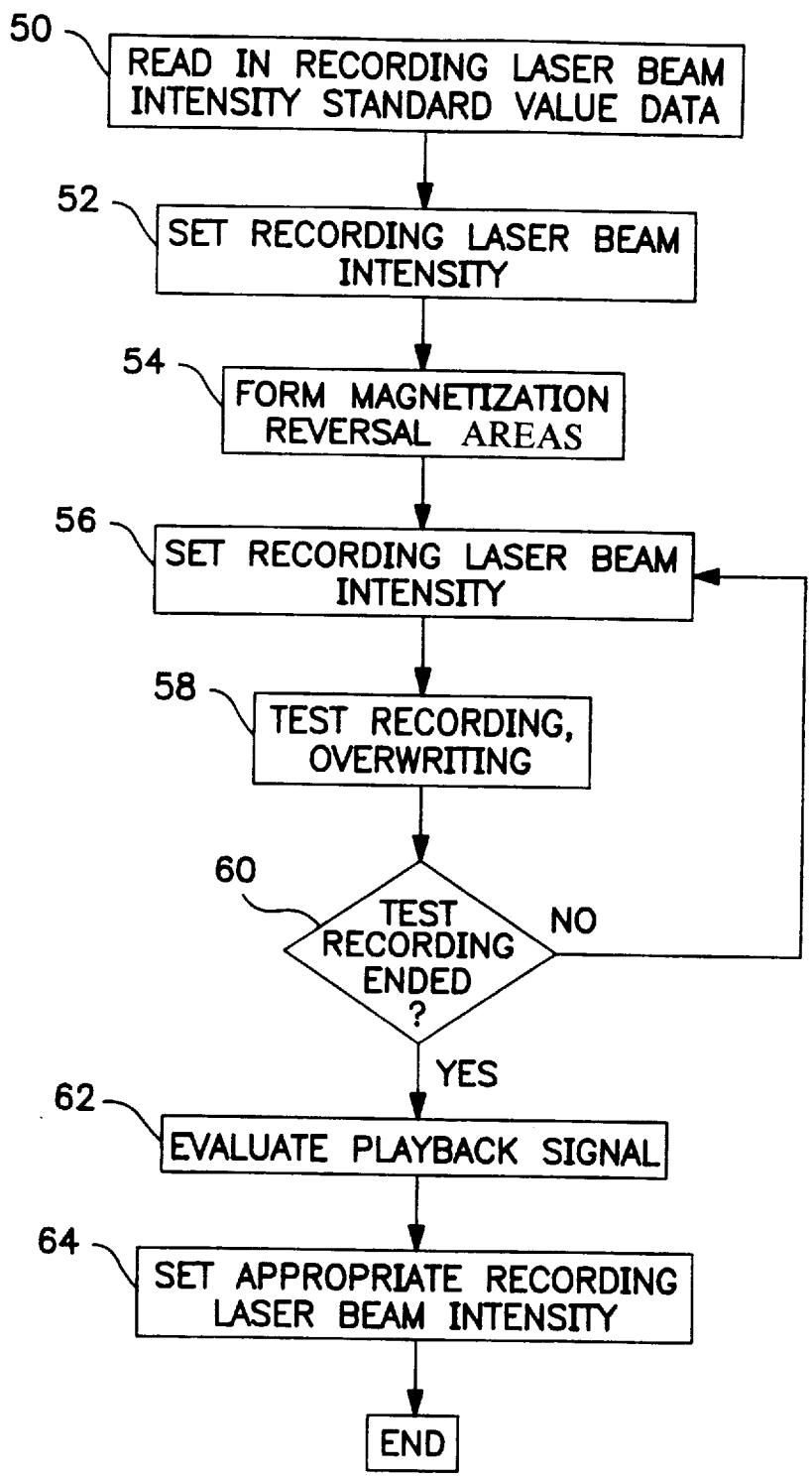
FIG. 2 is a flow chart illustrating the optical recording method according to a second embodiment of the present invention.

A description will next be given of the second embodiment of the present invention, with reference to FIG. 2.

A magnetooptical disk is provided which can be overwritten by optical modulation. The magnetooptical disk is divided into a plurality of zones whose recording frequencies differ. In a predetermined region, recording laser beam intensity standard value data for each recording zone is recorded.

Setting the magnetooptical disk in a record and replay device, data relating to recording laser beam intensity is read in from the predetermined region in step 50. From the values read from the disk, a low level and a high level of laser beam intensity are set in step 52, thus forming magnetization reversal areas in step 54 in the test recording region. By setting the laser beam intensity in step 56 at this time to be larger than a standard value of the recording laser beam intensity, magnetization reversal areas can be formed which are wider than the marks formed by the standard value of laser beam intensity. Moreover, when the setting value of laser beam intensity is much larger than the standard value, there is a possibility that problems arise such as the data of the adjacent track(s) may be erased. In practice, a setting of about 1% to 20% greater than the standard value is preferable for the high level of the laser beam intensity.

Next, in a plurality of sectors of the test recording region, magnetization reversal areas are formed by a laser beam intensity which has been set in the above manner. After this, while causing the laser beam intensity to change in every sector or in every plural sectors, to not erase the regions in which magnetization reversal areas have been formed, overwriting test recording is performed in step 58.

Once the test recording has ended in step 60, the test recorded regions are played back, and an appropriate recording laser beam intensity is found by evaluating these playback signals in step 62. There are a number of methods for judging appropriateness.

A first method, involves recording a test recording pattern according to a specific pattern, and comparing the pattern demodulated from the playback signal with the test recording pattern, thus allowing errors to be detected. At an intensity which is shifted from the appropriate recording laser beam intensity, when the recorded marks are played back, due to the recording not being performed appropriately, the pattern from the playback signal differs from the recorded pattern, and errors are detected. An appropriate power is appropriately set close to the center of a region in which no error is detected. The recording laser beam intensity is set by such a method in step 64.

In accordance with the embodiment of the present invention as described hereinabove, in the case of recording on an overwriteable optical disk, because the recording laser beam intensity can be appropriately set, it does not happen that overwriting is not performed sufficiently because erasure becomes poor with $P_L$ set too low, and stabilized overwriting can be attained.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of optical recording, comprising the steps of:

forming magnetization reversal areas in a test recording region of an overwriteable optical recording medium;

illuminating the magnetization reversal areas with a laser beam;

playing back the test pattern in the test recording region as a playback signal; and setting only a low level recording laser beam intensity by finding an erasure factor from the playback signal.

2. A method of optical recording according to claim 1, further comprising the step of using a magnetooptical recording medium which contains at least two magnetic layers which are mutually exchange coupled as the optical recording medium.

3. A method of optical recording according to claim 1, wherein the step of forming the magnetization reversal areas includes the step of illuminating the optical recording medium with a laser beam.

4. A method of optical recording according to claim 1, wherein the step of forming the magnetization reversal areas includes the step of forming the areas in a plurality of sectors of the test recording region, and further comprising the step of changing the laser beam intensity for erasure every sector or every plural sectors.

5. A method of optical recording, comprising the steps of:

forming magnetization reversal areas in a test recording region of an overwriteable optical recording medium;

illuminating the magnetization reversal areas with a laser beam;

playing back the test pattern in the test recording region as a playback signal; and setting a low level recording laser beam intensity by finding an erasure factor from the playback signal, wherein the step of setting the low level recording laser beam intensity includes the step of setting the predetermined erasure factor beforehand in the range of ½ to ¹⁄₁₀, and the laser beam intensity that accomplishes the erasure factor which is found from the playback signal to be smaller than the predetermined erasure factor is taken as the low level recording laser beam intensity.

6. A method of optical recording according to claim 5, wherein a value, multiplied by a predetermined coefficient, of the laser beam intensity for which the erasure factor found from the playback signal becomes smaller than the predetermined erasure factor, is taken as the low level recording laser beam intensity.

7. A method of optical recording according to claim 1, further comprising the step of setting a high level recording laser beam intensity by performing test recording after setting the low level recording laser beam intensity.

8. A method of optical recording, comprising the steps of:

forming magnetization reversal areas in a test recording region of an overwriteable optical recording medium; and setting a recording laser beam intensity by performing a test recording on the overwriteable optical recording medium, wherein the magnetization reversal areas are not erased, and the test recording is performed in this region by overwriting, wherein the step of forming the magnetization reversal areas includes the step of illuminating the optical recording medium with a laser beam, and wherein the step of illuminating the optical recording medium includes the step of using a laser beam having an intensity from 1 to 20% greater than a laser beam intensity during test recording.

* * * * *